United States Patent [19]
Kuhns

[11] 3,865,264
[45] Feb. 11, 1975

[54] SPARE TIRE MOUNT

[75] Inventor: John P. Kuhns, Hurst, Tex.

[73] Assignee: Caddie Industries, Inc., Fort Worth, Tex.

[22] Filed: Oct. 10, 1972

[21] Appl. No.: 296,029

[52] U.S. Cl............................ 214/451, 224/42.23
[51] Int. Cl............................................ B62d 43/04
[58] Field of Search........ 214/451, 454; 188/31, 60, 188/69

[56] References Cited
UNITED STATES PATENTS

| | | | |
|---|---|---|---|
| 2,121,869 | 6/1938 | Greenawalt | 188/31 |
| 2,325,848 | 8/1943 | Gildea | 214/451 |
| 2,823,069 | 2/1958 | Walker | 214/451 |
| 3,539,152 | 11/1970 | Paul | 214/451 |
| 3,542,413 | 11/1970 | Hardison | 214/451 |
| 3,554,397 | 1/1971 | Cluff | 214/451 |

*Primary Examiner*—Robert J. Spar
*Assistant Examiner*—Jerold M. Forsberg
*Attorney, Agent, or Firm*—Wm. T. Wofford; Wofford, Felsman, Fails & Zobal

[57] ABSTRACT

The specification discloses a device for mounting a spare tire to the underside of a motor vehicle and includes a winch located in a housing adapted to be connected to the inside surface of the side wall of the vehicle next to access holes; a flexible cable having one end attached to the winch shaft and another end adapted to be releasably coupled to the spare tire; and a bracket to be attached to the underside of the vehicle for supporting the cable and hence the tire beneath the vehicle. A ratchet including a ratchet wheel secured to the winch shaft and a pawl is provided for normally allowing the winch shaft to be rotated only in a direction to wind the cable on the shaft to raise the spare tire upward to an elevated storage position beneath the vehicle. Also provided is a lock having a bolt operable by a key for releasing the pawl to allow the tire to be lowered by the force of gravity. The winch shaft has a threaded end for receiving a lug nut to enable the shaft to be rotated by way of a lug wrench.

8 Claims, 13 Drawing Figures

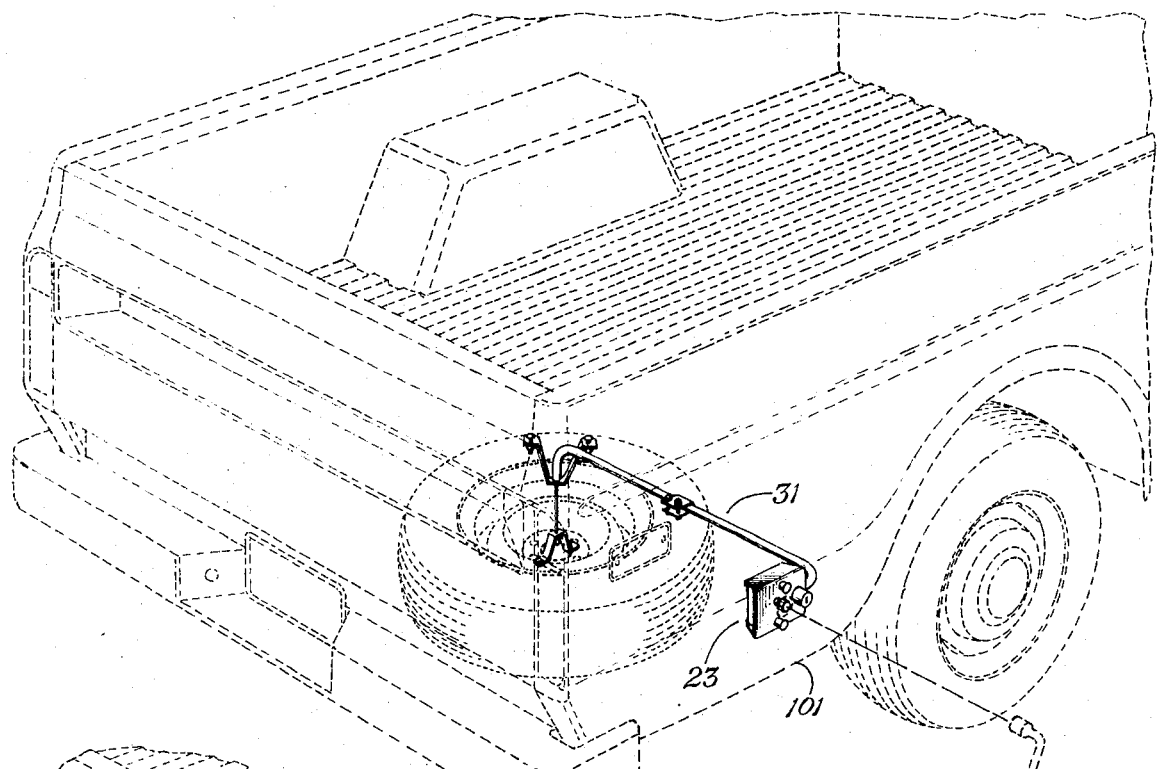
Fig. 1
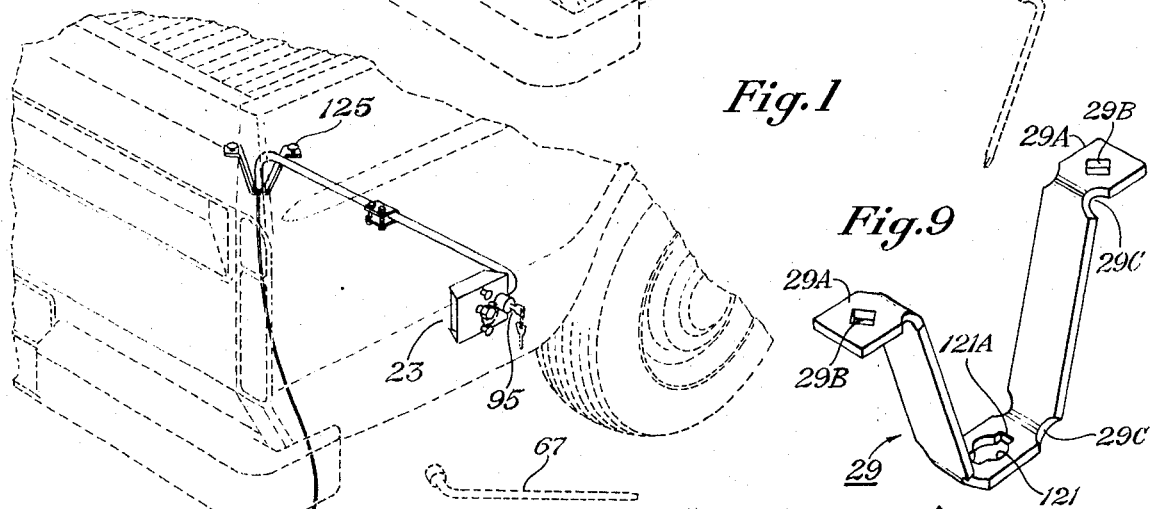
Fig. 2
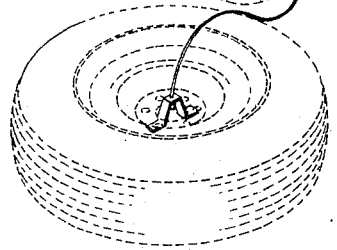
Fig. 6
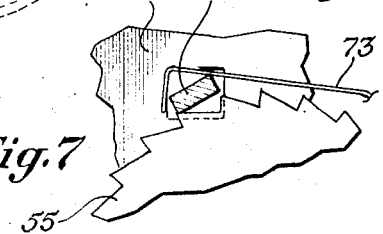
Fig. 7
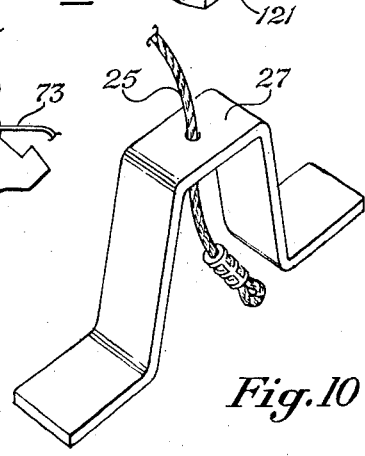
Fig. 9
Fig. 10

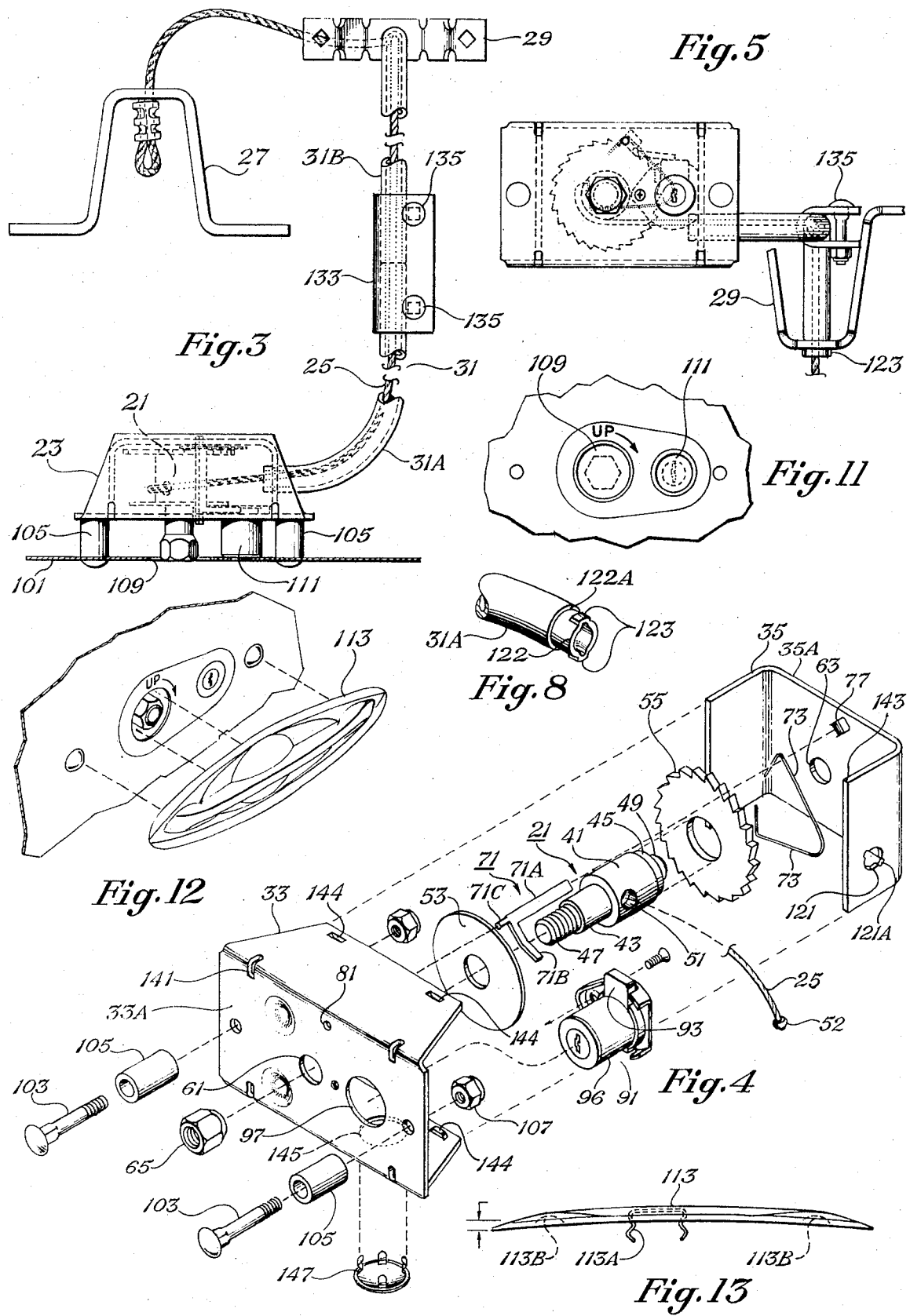

3,865,264

SPARE TIRE MOUNT

BACKGROUND OF THE INVENTION

This invention relates to a universal device for mounting a spare tire to the underside of different types of motor vehicles.

A number of devices have been proposed or built for mounting a spare tire to the underside of motor vehicles, however the known devices have disadvantages in that they are difficult to operate or they are adapted for use on only one type of vehicle.

SUMMARY OF THE INVENTION

It is the object of the present invention to provide a universal device for mounting a spare tire to the underside of a motor vehicle and which may be employed on different types of vehicles and hence on vehicles of different sizes.

It is a further object of the present invention to provide a spare tire mounting device which is simple, effective, and economical.

The device comprises a winch including a rotatable shaft adapted to be attached to a motor vehicle; a flexible cable having a first end attached to the shaft of the winch and a second end adapted to be releasably coupled to a tire. A support means or bracket is provided to be attached to the underside of the motor vehicle for supporting the cable and the tire. The shaft is operable upon rotation in a first direction to wind the cable to raise the spare tire upward to an elevated storage position. It is capable of rotation in an opposite direction to allow the cable to unwind to lower the spare tire.

In one aspect, a ratchet wheel is secured to the shaft for rotation therewith and a pawl is operatively associated with the ratchet wheel and positioned to normally prevent the ratchet wheel and hence the shaft from rotation in said opposite direction thereby preventing the cable from unwinding. Also provided is a lock having a bolt operable by a key for moving the pawl to a position to release the ratchet wheel and hence the shaft to allow the tire to be lowered by unwinding the cable.

In a further aspect, the shaft has a threaded end adapted to receive a threaded lug nut to allow the shaft to be rotated by a lug wrench to wind the cable on the shaft. The threaded shaft end and lug nut provide a safety feature in that is the operator attempts to force the winch in the wrong direction, the lug nut will be unscrewed thereby preventing permanent damage to the winch mechanism.

In another aspect, the winch is supported in a housing having a face through which extend the threaded end of the shaft and the end of the lock mechanism. The housing is adapted to be attached to the inside surface of the side wall structure of the vehicle in a manner to locate the face of the housing close to the inside surface such that access to the lug nut and lock may be provided through opening formed through the side wall of the vehicle. In addition, spacers are provided for spacing the face inward from the side wall of the vehicle to locate the lug nut and the end of the lock mechanism generally flush with the wall structure of the vehicle.

A load carrying conduit extends from the housing to the support bracket through which the cable extends. The conduit comprises two rigid conduit sections, one section having one end coupled to the housing and the other section having one end coupled to the support bracket. A sleeve is provided for rigidly coupling together the other ends of the conduit sections at different positions relative to each other for adjustment purposes.

BRIEF DESCRIPTION OF THE DRAWINGS

FIG. 1 illustrates the device of the present invention attached to a pickup truck to support a spare tire to the underside of the truck;

FIG. 2 is a view similar to FIG. 1 but illustrating the spare tire supported on the ground prior to being raised by the device or after being lowered thereby;

FIG. 3 illustrates the various component parts of the present device when assembled;

FIG. 4 is an exploded view of the housing for supporting the winch mechanism of the present device;

FIG. 5 is a front view of the housing mechanism and cable conduits illustrating the operative relationship of the ratchet wheel, pawl, and lock mechanism when assembled within the housing;

FIG. 6 illustrates the locked position of the pawl;

FIG. 7 illustrates the unlocked or released position of the pawl;

FIG. 8 is an end of one of the conduit sections forming the cable conduit;

FIG. 9 illustrates a mounting bracket employed to support the cable to the underside of the vehicle;

FIG. 10 illustrates a bracket or hook for releasably attaching the spare tire to the cable;

FIG. 11 is an outside view of the body panel of the vehicle having openings formed through the side wall for providing access to the lug nut and the lock of the present device;

FIG. 12 illustrates a decal which may be coupled to the side of the vehicle to cover the openings shown in FIG. 11; and FIG. 13 is an end view of the decal showing its attaching mechanism.

DETAILED DESCRIPTION OF THE INVENTION

Referring now to the drawings, the spare tire support and mounting device comprises a winch including a winch shaft 21 supported for rotation in a housing 23 adapted to be attached to the motor vehicle which is illustrated as a pickup truck,. Attached to the shaft 21 is one end of a flexible steel cable 25. The other end of the cable has a bell-shaped bracket or hook 27 attached thereto and adapted to be inserted through the tire opening for holding and supporting the tire. A mounting bracket 29 is provided for attachment to the underside of the vehicle for supporting the cable and hence the tire beneath the vehicle. Extending from the housing 23 to the mounting bracket 29 is a cable conduit 31 which acts as a reaction or load carrying member. The housing 23 is formed from two sections 33 and 35 adapted to be coupled together to form a box-like housing for supporting the shaft 23 for rotation. Section 33 has a flat face 33A adapted to be located close to but spaced from the inside surface of the side wall of the motor vehicle.

The shaft 21 comprises a cylindrical member formed of steel and having an enlarged central portion 41, smaller diametered portions 43 and 45 on each side of the central portion, a threaded end 47 extending from portion 43 and an opposite end 49 which is cylindrical and has a diameter smaller than the diameter of portion 45. The cable 25 is attached to the central portion 41 and is adapted to be wound thereon when the shaft is rotated clockwise as seen in FIGS. 4 and 5. An aperture 51 is formed through the central portion of the shaft for receiving the end of the cable. After insertion through the aperture 51, a button or knob 52 is attached to the cable end to hold the cable to the shaft. Rigidly secured around the smaller diametered portions 43 and 45 and next to the central portion of the shaft is a washer 53 and a ratchet wheel 55. These members act as a guide for the cable when wound on the shaft. Cylindrical portions 43 and 49 extend through openings 61 and 63 formed through the walls 33A and 35A of the two housing sections, for supporting the shaft for rotation within the housing. When assembled, threaded end 47 also extends through opening 61 for receiving a lug not 65 as illustrated in FIGS. 3 and 4. In order to wind the cable on the shaft to raise the tire, a lug wrench, illustrated at 67 in FIG. 2 is fitted around the lug nut and rotated clockwise as seen in FIGS. 4 and 5.

Cooperating with the ratchet wheel 55 is a pawl 71, normally biased by a spring 73 into effective engagement with the ratchet wheel to allow only clockwise rotation of the ratchet wheel and winch shaft. Thus when the pawl effectively engages the ratchet wheel the cable may be wound on the shaft but not unwound therefrom. The pawl comprises and L-shaped member having a long flat bar 71A adapted to engage the teeth of the ratchet wheel and a bent member 71B extending transversely from the bar 71A at a right angle therefrom. The free end of bar 71B extends into an enlarged square shaped aperture 77 formed in the rear end 35A of the housing. A shaft-like extension 71C extends from the opposite end of bar 71A and is adapted to be inserted into a small aperture 81 formed through front face 33A for supporting the pawl.

Located within the housing and secured to the inside of face 33A is a lock 91 having a bolt 93 adapted to be moved upward or downward by turning a key, illustrated at 95, in opposite directions respectively. The lock head 96 extends through opening 97 formed through face 33A of the box. When the bolt 93 is moved upward it contacts the portion 71B of the pawl to cause it and the bar 71A to rotate counterclockwise (as seen in FIGS. 6 and 7) to effectively release the pawl from the ratchet wheel. Movement of the bolt 93 to the downward position allows the spring 73 to bias the pawl into effective enagement with the ratchet wheel.

When the cable is being wound or has been wound on the shaft, the key will be turned to locate the bolt 93 in a downward position to allow the bar 71A to effectively engage the ratchet teeth to allow only clockwise rotation of the ratchet wheel. When it is desired to release the tire, the key 95 is turned to raise the bolt 93 to release the pawl. This moves the pawl out of effective engagement with the ratchet wheel whereby the ratchet wheel and the shaft are free to turn counterclockwise. The weight of the tire will cause the cable to unwind to allow the tire to free fall to the ground.

Due to the manner in which the pawl 71 is constructed and supported, very little effort is required in turning the key to release the pawl to lower the tire. In the locked position, the bar 71A of the pawl engages the heel of the following tooth and the face of the locking tooth. This is illustrated in FIG. 6. When the key 95 is turned to raise the bolt 93, the bar 71A rotates and pivots against the heel of the following tooth to position the face of the bar up and out of engagement with the locking tooth. This is illustrated in FIG. 7. Thus, in the unlocked position, the pawl will be released, however, it will not be completely lifted out of the recess between adjacent teeth and in fact will engage the heel of the following tooth. Due to the angle which the bar makes with the locking tooth, however, the ratchet wheel is capable of being rotated counterclockwise below the bar 71A when it is in its released position. Since the distance between the pivot point on the teeth of the ratchet wheel, and the lock 91 is relatively great, a mechanical advantage is obtained thereby requiring very little pressure to release the pawl. Moreover, in releasing the pawl, the key turns one-half of a revolution to obtain a relatively large lock stroke compared to the movement which the bar 71A undergoes when it is released. Hence a small torque at the key results in a large torque at the bar end of the pawl to facilitate release of the pawl.

In the embodiment disclosed, the housing 23 is mounted on the side of the truck on its rear fender panel 101 behind the rear wheel while the bracket 29 is mounted to the underside of the bed of the truck centered above the spare tire center location. The housing 23 is attached to the inside surface of the panel wall 101 by way of bolts 103, spacers 105, and nuts 107. Apertures 109 and 111 are formed through the wall 101 of the vehicle to allow access to the lug nut 65 and to the head 96 of the lock. As illustrated in FIG. 3, spacers 105 support the housing face 33A as a position spaced inward from the inside surface of wall 101 such that the lug nut 65 and lock head 96 will extend to a position about flush with the wall 101. A cover plate 113 is provided for attachment to the panel wall 101 over the apertures 109 and 111. The cover plate has a clip 113A which may fit within aperture 109 to hold the cover plate to the side of the vehicle. Indentations 113B mate with the heads of the bolts 103 to maintain the cover plate in proper alignment.

As shown in the drawings, cable 25 extends through conduit 31. This conduit is part of the mounting device and acts as a reaction or load carrying member between the mounting bracket 29 and the housing 23. Hence from the mounting bracket outward, the vehicle structure, such as the fender panel, is not relied on to carry the load of the tire. Thus assurance is provided that the tire load will be adequately carried regardless of the structure of the vehicle body to which the device is mounted.

Referring again to FIG. 3, the cable conduit 31 is formed in two sections 31A and 31B of metal tubing. These sections have their opposite ends bent and attached to the housing 23 and to the bracket 29 respectively. As illustrated in FIG. 8, the bent end of the section 31A has an end portion 122 of reduced diameter with extending edges or keys 123. The bent end of section 31B is formed in a similar manner. An aperture 121 with slots 121A is provided in the housing 23 for receiving the end portion 122 of section 31A for attaching the section 31A to the housing 23. Similarly an aperture 121 is provided in the bracket 29 for receiving the bent end of section 31B for attaching the section 31B to the bracket. The keys 123 mate with slots 121A of the apertures 121 to prevent the sections from being removed from the apertures 121 formed in the housing and bracket after the sections had been inserted into apertures 121 and rotated slightly. Shoulders 122A of the sections will bear against the housing and bracket wall structure to limit the distance to which the sections may be inserted into the apertures 121. Housing 23 may be turned to different position relative to section 31A while bracket 29 may be turned to different positions relative to section 31B. In addition sections 31A and 31B may be turned to different positions relative to each other and then locked together with a metal sleeve 133 and bolts illustrated at 135. Thus the bracket 29 may be mounted at various angles relative to the conduit 31 while the housing 23 may be mounted in various positions to the body fender. The housing 23 is shown as mounted such that the curved portion of section 31A is in a horizontal plane.

In addition by forming the cable conduit in two sections and by providing the sleeve 133 for locking the two sections together, the length of the cable conduit may be adjusted to various sizes to allow the device to be attached to vehicles of different manufacturers.

Although the primary purpose of conduit 31 is to act as a load carrying or reaction member, it also acts as a dust cover for the cable and provides additional protection against a person cutting the cable to remove the tire and hence minimizes theft of the tire.

The manner in which the mounting device is operated to raise or lower a tire is as follows. Assume that it is desired to lower the spare tire from the vehicle. In this case, the key 95 will be turned to a position to cause the bolt 93 to be moved upward to release the pawl 71. The ratchet wheel 55 and hence the shaft 41 thus will be free to rotate counterclockwise whereby the weight of the tire will cause the cable to unwind to allow the tire to drop to the ground. When it is desired to store the tire to the underside of the vehicle, the hook 27 will be inserted through the opening of the tire. Due to the bell shape of the hook, it is self-centering. The key 95 then will be turned to a position to lower the bolt 93 to a locked position to allow the spring 73 to move the bar of the pawl 71 into effective engagement with the face of a locking tooth to prevent counterclockwise rotation of the ratchet and hence the shaft 21. The lug wrench 67 then will be fitted around the lug nut 65 and rotated in a clockwise direction to cause the cable 25 to be wound upon the shaft 21 to raise the tire to the elevated and storage position.

The threads 47 are formed on the end of the shaft 21 in such a manner that the lug nut 65 will be threaded onto the threaded end when rotated in a clockwise direction. This provides a safety feature in that the lug nut will be unscrewed from the shaft rather than causing permanent damage to the winch mechanism in the event that the operator attempts to rotate the lug wrench and hence the lug nut in the wrong (counterclockwise) direction when the pawl 71 is in its locked position.

The diameter of the threads 47 are of the standard type and are formed to match the conventional lug nuts whereby the lug nut of the particular vehicle to which the device is to be installed will be selected for threading onto the shaft 21 whereby the equipment lug wrench of the vehicle can be utilized to operate the winch.

As illustrated in FIG. 9, the support bracket 29 has arms 29A which are adapted to fit against the underside of the bed of the pickup truck and to straddle the supporting ridges of the bed. Apertures 29B formed in the arms are provided to allow the bracket to be attached to the underside of the bed by way of bolts illustrated at 125 in FIG. 2. The mounting bracket 29 also has reduced section area portions such as notches 29C formed therein to allow the bracket to be readily bent to various shapes for adjustment purposes whereby it can be made to fit various types of vehicles.

Referring again to FIG. 4, the housing section 33 has notches or apertures 141 formed therein to receive corner portions 143 of the housing section 35 for relative positioning of the two sections. Housing section 33 is provided with indentations 144 at its rear edge portions which overhang wall 35A to secure housing section 35 to housing section 33. Housing section 33 also has an aperture 145 formed therein below the enlarged portion 41 of the shaft 21 to allow access to the interior of the housing in the event that it is desired to replace the cable 25. A cap 147 is provided for covering the hole 145 when not in use.

In one embodiment, the washer 53 and ratchet wheel 55 may be swaged to the sahft 21 around cylindrical portions 43 and 45.

I claim:

1. A device for mounting a spare tire to the underside of a motor vehicle, comprising:

winch means including a rotatable means adapted to be attached to a motor vehicle, a flexible cable having a first end attached to said rotatable means of said winch means and a second end adapted to be releasably coupled to a tire, support means adapted to be attached to the underside of the motor vehicle for supporting said cable and the spare tire, said rotatable means being operable upon rotations in a first direction to wind the cable to raise the spare tire upward to and elevated storage position, said rotatable meand being capable of rotation in an opposite direction to allow the cable to unwind to lower the spare tire, said rotatable means of said winch means being supported by a housing, said housing having a face beyond which extend an end of said rotatable means and an end of said lock, said housing being adapted to be attached to the inside surface of the side wall structure of the vehicle in a manner to locate the face of said housing close to said inside surface such thet access to said end of said rotatable means and to said end of said lock may be provided through opening means formed through the side wall structure, and spacer means for spacing said face inward from the side wall structure of the vehicle to locate said end of said rotatable means and said end of said lock generally flush with said wall structure of said vehicle, a ratchet wheel secured to said rotatable means for rotation therewith, a pawl operatively associated with said ratchet wheel and normally positioned to allow rotation of said ratchet wheel and said rotatable means in said first direction but to prevent said ratchet wheel and said rotatable means for rotating in said opposite direction, and a lock having a bolt operable by a key for moving said pawl to a position ineffective to hold said ratchet wheel against rotation in said opposite direction, a load carrying conduit means extending from said housing to said support means, said conduit means comprising at least two rigid conduit sections, one section having one end coupled to said housing and the other section having one end coupled to said support means, said cable being located to extend through said two conduit sections from said housing to said support means, said ends of said sections being coupled to said housing and to said support means in a manner to allow said housing and said support means to be turned to different positions relative to their associated sections, and sleeve means for rigidly coupling together the other ends of said conduit sections at different positions relative to each other for adjustment purposes.

2. A device for mounting a spare tire to the underside of a motor vehicle, comprising:

winch means including a rotatable means located in a housing adapted to be attached to a motor vehicle, a flexible cable having a first end attached to said rotatable means of said winch means and a second end adapted to be releasably coupled to a tire, support means adapted to be attached to the underside of the motor vehicle at a position spaced from said housing for supporting said cable and the tire, conduit means extending from said housing to said support means, said cable being located to extend through said conduit means from said housing to said support means, said rotatable means being operable upon rotation in a first direction to wind the cable to raise the spare tire upward to an elevated storage position, said rotatable means being capable of rotation in an opposite direction to allow the cable to unwind to lower the spare tire, means for preventing rotation of said rotatable means in said opposite direction at least when said cable is wound thereon and the spare tire is located at the elevated storage position, said rotatable means having a threaded end extending out of an opening formed in a side of said housing and adapted to receive a threaded lug nut to allow said rotatable means to be rotated by a lug wrench when coupled to said nut to wind said cable on said rotatable means, the threads on said threaded end being formed in a manner to allow the lug nut to be threaded onto said threaded end when rotated in said first direction and to be unthreaded from said threaded end when rotated in said opposite direction whereby rotation of said rotatable means in said first direction by a lug wrench coupled to the lug nut tends to tighten said lug nut to said threaded end and rotation in said opposite direction by a lug wrench when said rotatable means is locked against rotation will unthread said lug nut from said threaded end.

3. The device of claim 2 wherein:

said housing is adapted to be attached to the inside surface of the side wall structure of the vehicle in a manner to locate said side of said housing close to said inside surface such that access to said lug nut may be provided through opening means formed through the side wall structure, and spacer means for spacing said face inward from the side wall structure of the vehicle to locate said end of said rotatable means and said end of said lock generally with said wall structure of said vehicle.

4. The device of claim 2 wherein:

said conduit means comprises at least two rigid conduit sections, one section having one end coupled to said housing and the other section having one end coupled to said support means, said ends of said sections being coupled to said housing and to said support means in a manner to allow said housing and said support means to be turned to different positions relative to their associated sections, and sleeve means for rigidly coupling together the other ends of said conduit sections at different spaced positions relative to each other and at different angular positions relative to their axes for adjustment purposes, said cable extending through said two conduit sections from said housing to said support means.

5. A device for mounting a spare tire to the underside of a motor vehicle, comprising:

winch means carried by a housing and including a rotatable means adapted to be attached to a motor vehicle.

a flexible cable having a first end attached to said rotatable means of said winch means and a second end adapted to be realeasably coupled to a tire, support means adapted to be attached to the underside of the motor vehicle at a position spaced from said housing for supporting said cable and the tire, said rotatable means being operable upon rotation in a first direction to wind the cable to raise the spare tire upward to an elevated storage position, said rotatable means being capable of rotation in an opposite direction to allow the cable to unwind to lower the spare tire, holding means for preventing rotation of said rotatable means in said opposite direction at least when said cable is wound thereon and the spare tire is located at the elevated storage position, and a load carrying conduit means extending from said housing to said support means, said cable being located to extend through said conduit means from said housing to said support means, said conduit means comprising at least two rigid conduit sections, one section having one end coupled to said housing and the other section having one end coupled to said support means, said ends of said sections being coupled to said housing and to said support means in a manner to allow said housing and said support means to be turned to different positions relative to their associated sections, and sleeve means for rigidly coupling together the other ends of said conduit sections at different spaced positions relative to each other and at different angular positions relative to their axes for adjustment purposes, said cable extending through said two conduit sections from said housing to said support means.

6. The device of claim 5, wherein said holding means comprises:

a ratchet wheel secured to said rotatable means for rotation therewith, and a pawl operatively associated with said ratchet wheel and normally positioned to allow rotation of said ratchet wheel and said rotatable means in said first direction but to prevent said ratchet and said rotatable means for rotating in said opposite direction, a lock having a bolt adapted to engage said pawl, said bolt being operable by a key for moving said pawl to a position ineffective to hold said ratchet wheel against rotation in said opposite direction, said housing having a side beyond which extend an end of said rotatable means and an end of said lock, said end of said rotatable means being threaded and adapted to receive a threaded lug nut to allow said rotatable means to be rotated by a lug wrench when coupled to said nut to wind said cable on said rotatable means, the threads of said threaded end being formed in a manner to allow the lug nut to be threaded onto said threaded end when rotated in said first direction and to be unthreaded from said threaded end when rotated in said opposite direction whereby rotation of said rotatable means in said first direction by a lug wrench coupled to said lug nut tends to tighten said lug nut to said threaded end and rotation in said opposite direction by a lug wrench when said rotatable means is locked against rotation will unthread said lug nut from said threadd end.

7. The device of claim 6 wherein:

said conduit sections each have curved ends extending from straight portions are coupled together in alignment, said curved ends may be located in different planes, said curved ends being coupled to said housing and to said support means respectfully and said straight portions being adapted to be coupled together by said sleeve means.

8. The device of claim 7 wherein:

said housing is adapted to be attached to the inside surface of the sidewall structure of the vehicle in a manner to locate said side of said housing close to said inside surface such that access to said lug nut and to said end of said lock may be provided through opening means formed through the sidewall structure, and spacer means for spacing said side of said housing inward from the sidewall structure of the vehicle to locate said lug nut and said end of said lock generally flush with said wall structure of said vehicle.

* * * * *